May 23, 1961  D. O. STRICKLAND  2,985,379
SELF-PROPELLED ROW CROP SPRAYER
Filed Aug. 27, 1956  8 Sheets-Sheet 1

David O. Strickland
INVENTOR.

May 23, 1961 D. O. STRICKLAND 2,985,379
SELF-PROPELLED ROW CROP SPRAYER

Filed Aug. 27, 1956 8 Sheets-Sheet 2

FIG. 2

David O. Strickland
INVENTOR.

BY
*Attorneys*

FIG. 3

David O. Strickland
INVENTOR.

May 23, 1961 D. O. STRICKLAND 2,985,379
SELF-PROPELLED ROW CROP SPRAYER
Filed Aug. 27, 1956 8 Sheets-Sheet 5

David O. Strickland
INVENTOR.

May 23, 1961　　　D. O. STRICKLAND　　　2,985,379
SELF-PROPELLED ROW CROP SPRAYER
Filed Aug. 27, 1956　　　　　　　　　　　　　8 Sheets-Sheet 7

FIG. II

David O. Strickland
INVENTOR.

BY *Clarence A. O'Brien*
*and Harvey B. Jacobson*
Attorneys

May 23, 1961 D. O. STRICKLAND 2,985,379
SELF-PROPELLED ROW CROP SPRAYER
Filed Aug. 27, 1956 8 Sheets-Sheet 8

David O. Strickland
INVENTOR.

United States Patent Office 2,985,379
Patented May 23, 1961

2,985,379

SELF-PROPELLED ROW CROP SPRAYER

David O. Strickland, Rte. 3, Milton, Fla.

Filed Aug. 27, 1956, Ser. No. 606,449

11 Claims. (Cl. 239—127)

This invention generally relates to a tractor incorporating an elevated frame together with a drawbar removably mounted thereon for imparting pull to implements in the usual manner and which is adapted for specific use as a row crop sprayer.

An object of the present invention is to provide a a self-propelled row crop sprayer in which the width between the rear driving wheels is adjustable for permitting the device to be employed with row crops having different row spacings.

Another object of the present invention is to provide a self-propelled row crop sprayer having a vertically adjustable boom for spraying crops of varying heights and also including means for spraying the underside of the vines of a crop thereby thoroughly spraying the row crops.

A further important object of the present invention is to provide a row crop sprayer of the self-propelled type in which the various elements thereof may be easily removed, replaced or repaired and which may be easily serviced and maintained.

Still another important feature of the present invention is to provide a row crop sprayer in which the operator is in a position for easy observation of the path of movement of the sprayer and all of the controls are disposed in such a position for easy access by the operator thereby providing an efficient operation.

Other important objects of the present invention will reside in its simplicity of construction, stability, an agitation means for the spray liquid in the tank, independent control mechanism for a spray pump and the driving mechanism to permit either to be operated independently, separate control of the position of the spray boom, adaptation for various types of crops and its relatively inexpensive manufacturing and maintenance cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Referring now specifically to the drawings, the numeral 10 generally designates the self-propelled row crop sprayer of the present invention. The row crop sprayer 10 generally includes an elevated frame assembly generally designated by the numeral 12 having driving wheel support assemblies generally designated by the numeral 14 and a front wheel assembly generally designated by the numeral 16.

The frame 12 generally includes longitudinal converging box-frame rails 18 connected rigidly to cross members 68 and 70, and connected rigidly to column 56 thereby forming a rigid A-frame. The operator's seat 24 includes a back 26 and a supporting bracket 28 which pivotally supports the seat 24 at the front end together with a shock absorber 30 interconnecting the bracket 28 and the rear edge of the seat 24 whereby movement of the seat 24 is cushioned. The shock absorber 30 may be of any suitable construction and is illustrated in the form of an airplane type fluid shock absorber. Rearwardly diverging frame members 32 are provided with these frame members being interconnected by the rear frame member 34 which has a pair of inwardly facing vertical channels 36 disposed centrally thereof for a purpose described hereinafter.

The frame members 32 and 34 are in the form of triangulated truss members thereby rigidifying the frame assembly 12. A transverse member 40 interconnects the upper cord of the truss-like side members 32 and has a sleeve 42 mounted centrally thereon for rotatably supporting a steering column 44 having a steering wheel 46 at the rear end thereof with the wheel 46 being disposed in relation to the operator's seat 24 for rotating the steering column 44. The other end of the steering column 44 is provided with a universal connection 48 and a worm gear 50 which is in meshing engagement with a worm pinion 52 mounted on the upper end of a depending shaft 54 which is journaled in a depending tubular housing member 56 having an enlarged housing or gear casing 58 in the upper end thereof in which the worm gear 50 and worm pinion 52 are mounted. The vertical tubular housing 56 is rigidly secured to the apex of the converging side frame members 32 and terminates at its lower end in an inverted U-shaped yoke 60 having a transverse axle 62 mounting a front steerable wheel 64. A generally U-shaped plate guard 66 is provided forwardly of the front wheel 64 and is disposed in spaced relation to the ground surface whereby the front wheel 64 will be protected from engagement with any obstructions which may occur. This will eliminate any possibility of bending the vertically elongated shaft 54 disposed in the housing 56. With the steering control wheel 46, the angular position of the steerable wheel 64 may be adjusted thereby steering the self-propelled row crop sprayer 10 in the manner desired.

A pair of hollow box beam members 68 and 70 are disposed transversely of the longitudinal beams 18 and the transverse box frame members 68 and 70 are interconnected by longitudinal end rails 72 which coact along with the longitudinal rails 18 and the triangulated truss side frame members 32 to form an extremely rigid unit. Extending downwardly and forwardly from the forward box frame member 68 is a brace 74 which connects to the lower end of the vertical tubular housing 56 thereby forming a rigid support for the vertical tubular housing 56. The brace 74 is disposed adjacent each side of a supporting framework 76 extending rearwardly from the tubular housing 56 adjacent the lower end thereof. The supporting framework 76 terminates adjacent the center of the row crop sprayer 10 and supports a prime mover 78 thereon in the form of an internal combustion engine of suitable horsepower and size.

Figures 5, 6:
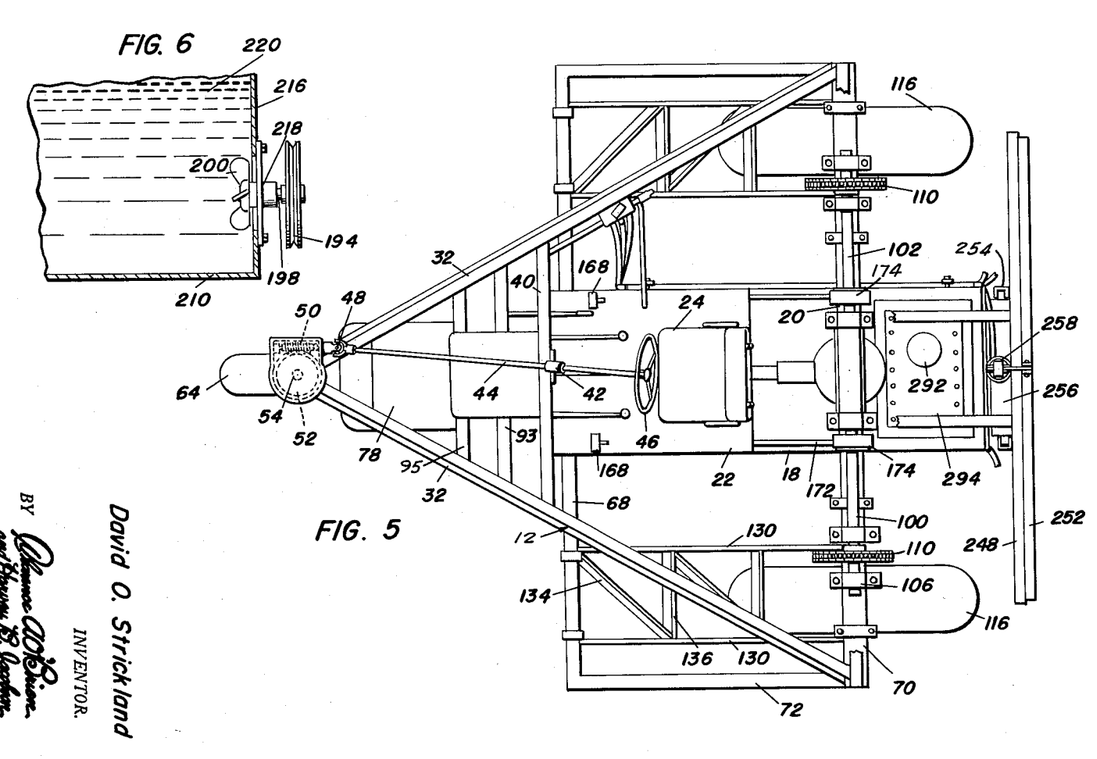
Figure 5 is a plan view of the construction shown in Figure 3.
Figure 6 is a detailed view illustrating the agitating propeller in the bottom of the spray tank.
Figure 7:
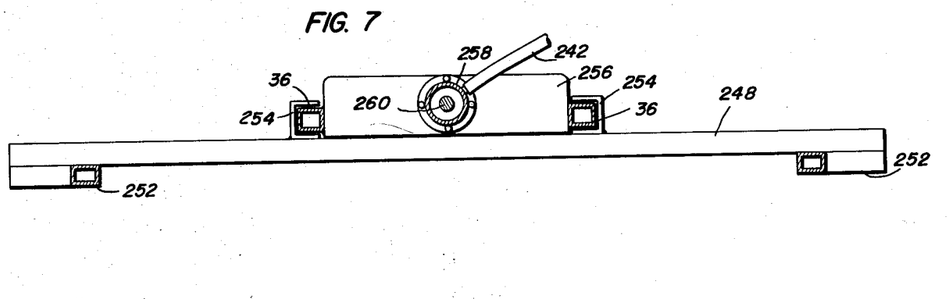
Figure 7 is a detailed plan sectional view taken substantially upon a plane passing along section line 7—7 of Figure 1 illustrating the construction for permitting vertical adjustment of the sprayer boom.

The engine 78 includes a power output shaft 80 having a multiple pulley 82 thereon for receiving a plurality of V-belts 84 which are also disposed in encircling relation to a multiple pulley 86 mounted on a vertically elevated power shaft 88 which forms the input to the transmission 90. The shaft 88 is supported at both ends in bearings 92. The transmission 90 is provided with a gear shift lever 94 for shifting the gear ratio of the transmission output or drive shaft 96 which is provided with a differential 98 at the rear end thereof with a pair of outwardly extending stub axles 100 and 102. The drive shaft 96 extends under the channel 23 substantially as illustrated in Figure 5. Each of the stub axles 100 and 102 is provided with an inner splined end 104 for engagement with the differential 98 and the outer end of the stub shaft 100 or 102 is supported in a pair of spaced bearings 106 with a sprocket gear 108 being mounted thereon between the bearings 106 for receiving a drive chain 110. The drive chain 110 is for propelling the vehicle.

Figure 8:
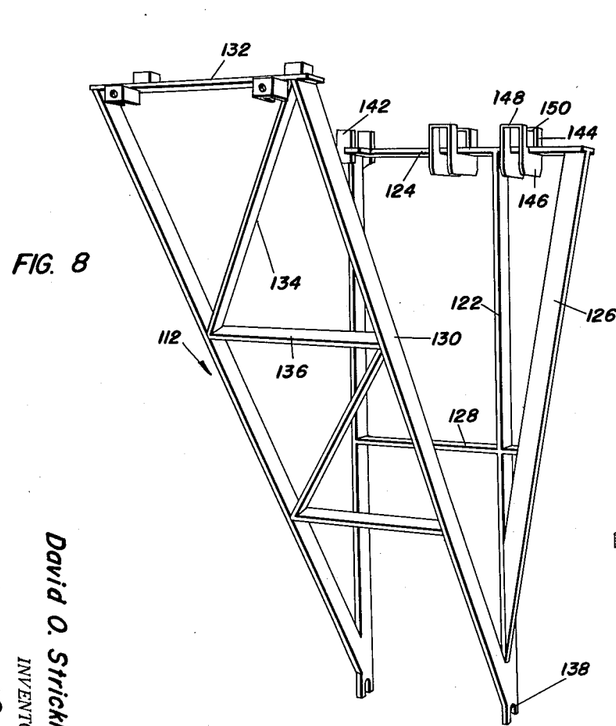
Figure 8 is a detailed perspective view of one supporting frame for a driving wheel.
Figure 9:
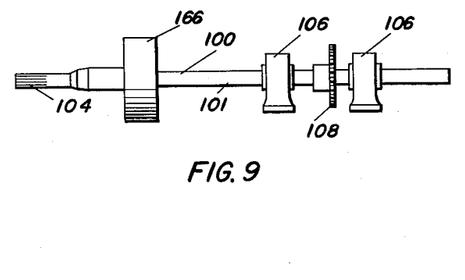
Figure 9 is a detailed elevational view of one of the drive axles.
Figure 10:
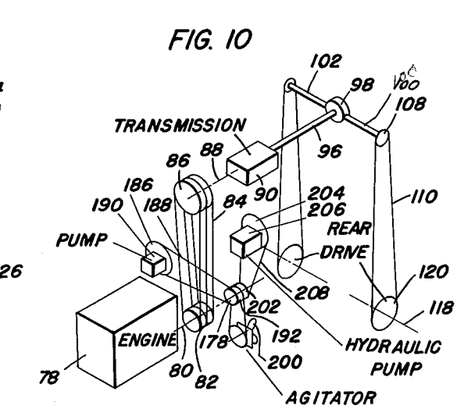
Figure 10 is a schematic view of the drive mechanisms for the various elements of the sprayer with the relationship thereof generally demonstrated.

A pair of wheel assemblies generally designated by the numeral 14 is supported on the transverse box frame beams or members 68 and 70 and each of these wheel assemblies 14 includes a supporting framework generally designated by the numeral 112 and specifically illustrated in Figure 8 which supports a driving wheel 114 which incorporates a pneumatic tire 116 or any other suitable tread forming device which is secured to an axle 118 having a sprocket gear 120 secured thereto with the sprocket gear 120 being engaged by the drive chain 110 for imparting rotation to the drive wheels 114 for propelling the row crop sprayer 10.

As illustrated in Figure 8, the supporting frame assembly includes a pair of vertical side members 122 which are joined at their upper ends by a transverse plate member 124 which extend beyond the side members 122. A pair of inclined reinforcing bars 126 extend from the outer ends of the elongated plate member 124 towards the lower end of the vertical members 122 and are rigidly joined therewith. A transverse reinforcing plate 128 is disposed between the side members 122 substantially at the center thereof and the plate 128 continues outwardly and rigidly connects to the inclined reinforcing braces or members 126 as illustrated in Figure 8. It is noted that the reinforcing members 126 are in perpendicular relation to the side members 122 as well as the plate 124 thereby further reinforcing the frame assembly. Extending upwardly from the lower front edges of the side members 122 is a pair of inclined side members 130 which are interconnected by a transverse upper plate 132 and a plurality of diagonal braces 134 as well as transverse braces 136. The apex of the side members 130 and 122 are all integral with the side members 122 continuing downwardly slightly and terminating in an upwardly extending notch 138 for receiving the axle 118 thereby mounting the wheel 114 in the bottom of the frame assembly 112.

The transverse plates 124 and 132 are clamped to the respective box beams 70 and 68 by packing bolts 140 with the inner side member 122 being provided with extensions 142 for positioning the plate 124 in underlying relation to the box beam 70. Also mounted on the plate 124 in spaced relation is a pair of brackets 144 which are in the form of U-shaped members having spaced legs 146 and a bight portion 148. A notch or slot 150 is disposed in the bight portion 148 of the bracket 144 for receiving and engaging the box beam 70 so that a pair of similar brackets 152 in inverted relation may be engaged in overlying relation to the brackets 144 and welded to supporting brackets 154 which support the bearing members 106 so that the bearing members 106 will slide longitudinally of the axle 100 when clamp bolts 156 are loosened and also clamp bolts 140 are loosened for sliding the rear driving wheel assemblies 14 laterally of the box beams 68 and 70 whereby the drive sprocket 108 is always in alignment with the driven sprocket 120.

The outer vertical side member 122 on one of the frame assemblies 112 of the rear wheel assemblies 14 is provided with a plurality of vertically spaced steps 158 for providing access to the vertically elevated frame platform by the operator of the vehicle. Also, a throw-out clutch mechanism 160 is provided between the multiple belt pulley 86 and the shaft 88 and the clutch mechanism is provided with an operating rod 162 having a handle 164 provided thereon which terminates adjacent the gear shaft lever 94 for disconnecting the transmission from the power source 78. The clutch 160 may be operated for stopping the vehicle whenever desired. The details of the clutch mechanism 160 are not illustrated and it will be understood that any type of clutch mechanism may be employed. Also, a brake drum 166 is provided on each axle together with a suitable bracket actuating mechanism including foot pedals 168 are provided for selectively applying brake pressure to either axle 100 and 102 for facilitating the steering control of the mechanism as well as facilitating proper braking action for the device.

The details of the brake operating mechanism is not specifically illustrated and it is pointed out that any suitable mechanism may be employed such as the conventional hydraulic or mechanical brakes employed in present day automotive vehicles. Connecting rods 170 and 172 are illustrated schematically in Figure 5 for interconnecting the brake pedals 168 and the brake shoes 174 mounted on the brake drums 166.

The output shaft 80 of the engine 78 is also provided with a clutch mechanism 176 having an elongated operating lever 178 which extends to a position adjacent the shift lever 94 and clutch operating lever 164 so that the portion of the shaft 80 extending outwardly beyond the pulley 82 may be disconnected. Outwardly of the clutch 176 is provided a drive pulley 178 on the shaft 80 which drives a lay shaft 180 mounted on bearings 182 supported from brakes 184 on the support assembly 76 whereby a pulley 186 mounted on the shaft 180 is driven by a V-belt 188 for actuating a fluid or liquid spray pump 190. Also positioned on the shaft 80 is a pulley 192 in alignment with a pulley 194 having a V-belt 196 encircling the same wherein the pulley 194 is mounted on the outer end of a shaft 198 which has an agitating propeller 200 disposed on the outer end thereof for rotating the propeller 200. A third power pulley 202 is provided on the shaft 80 and is in alignment with a pulley 204 on a hydraulic fluid pump 206 and the pulleys 202 and 204 are interconnected by a V-belt 208 which drives the hydraulic pump for supplying hydraulic pressure for a purpose described hereinafter.

Supported beneath the frame assembly 12 is an enlarged liquid spray tank 210 which may be of any suitable shape and size but which is preferably of generally oval shaped construction and the tank 210 is supported by a plurality of supporting straps 212 secured to the transverse beams by U-shaped clamp bolts 214. The front end of the tank is designated by the numeral 216 and an adapter 218 is provided for supporting the propeller 200 which agitates the liquid spray material 220 in the tank 210. Also disposed in the tank 210 is an inlet pipe 222 having perforations 224 in the inlet thereof and which extends to the inlet of the spray pump 190. The spray pump 190 is provided with a discharge conduit 226 which extends to a control valve 228 having a control handle 230 which is disposed adjacent the operator's seat 24 for discharging spray liquid under pressure into three conduits 232, which extend rearwardly along the tank and are supported by bracket members 234. A by-pass line 236 extends from the valve 228 back to the tank 210 and terminates in a longitudinal discharge pipe 238 having a plurality of apertures 240 therein wherein recirculated spray liquid will also tend to thoroughly mix and agitate the spray liquid 220 in the tank 210.

The hydraulic fluid pump 206 is provided with a discharge conduit 242 which extends under the brackets 234 and a control lever 244 is provided which extends upwardly to a point adjacent the operator's seat 24 for controlling the entry and exit of fluid from the pump 206 into the discharge conduit 242.

A vertically disposed carriage generally designated by the numeral 246 is supported rearwardly on the frame 12 and is guided by the depending vertical members 36 during vertical movement of the carriage 246.

The carriage 246 includes a pair of horizontal rails 248 interconnected adjacent the ends thereof by a pair of vertical rails 250. The two horizontal rails are also rigidly interconnected by inclined brace members 252 which extend between the horizontal rails 248 with the apex of the inclined braces 252 extending above the upper rail 248. The horizontal rails 248 are provided with a pair of inwardly facing channel shaped guides 254 which slidably engage the vertical box frame members 36 for slidably guiding the vertical movement of the carriage 246. The vertical member 36 is provided with a transverse lower plate 256 having a vertically disposed piston and cylinder arrangement 258 rigidly secured thereto and extending vertically therefrom. A piston rod 260 extends vertically from the piston and cylinder arrangement 258 and has a bracket 262 at the upper end thereof having a pulley 264 journaled therein. A cable 266 is entrained over the pulley 264 and has one end terminally secured to the tank 210 and the other end thereof terminally secured to the apex of the inclined braces 252. The fluid conduit 242 from the hydraulic pump 206 is connected to the piston and cylinder arrangement 258 for the purpose of supplying fluid under pressure and releasing the same for raising and lowering the carriage 246 upon actuation of the control lever 244.

Supported below the lower horizontal member 248 is a transverse discharge pipe 268 having a plurality of discharge nozzles 270 disposed thereon.

Supported outwardly of the carriage on either side thereof is a boom generally designated by the numeral 272 and including an elongated discharge pipe 274 having a plurality of discharge nozzles 276 disposed thereon. On certain of the nozzles 276 there is provided depending conduits or pipes 278 having an upwardly extending nozzle discharge means 280 on the lower end thereof for discharging liquid spray onto the undersurface of plants in the row crops. The outer ends of the pipe 274 are connected to a flexible line or chain 282 by means of a bracket 284 and the other end of the line 282 is connected to the ends of the upper horizontal bar 248 by pins 286. The inner ends of the pipes are supported on pivot links 288 supported from the lower horizontal bar 248 for resting against a spring loaded stop which prevents shock to pipe 274 when returning to a normal position after striking an object. A coil spring 290 is connected to an eye on lower rail 248 and a rearwardly extending bar 291 on pipe 274 to permit the boom 272 to swing rearwardly if an obstruction is encountered wherein the spring 290 will return the boom 272 to a normal position after the obstruction has been passed.

The specific details of the internal combustion engine which forms the power device for the sprayer has not been disclosed since any suitable engine may be employed. A 25 horsepower Wisconsin internal combustion engine having a four speed forward transmission has been effectively employed. A five to one ratio differential has been employed in this installation, and the drive axles are full floating. The tank is a 250 gallon capacity with a regulated 8 row boom adjustable from 36 inches to 42 inch rows. The rear wheel tread is adjustable from 6 to 7 foot center tread width. The boom is adjustable from 6 inches to 6 feet 8 inches in height. Total width of the machine is 8 feet and total length is 11 feet 8 inches. The sprayer pump will deliver 7 gallons per minute at 300 p.s.i. The rear tires are 10 by 28, 4 ply and the front tire is 6.50 by 16, 4 ply and each wheel may be disassembled by quickly removing four cap screws. All of the boom and the boom carriage is easily and quickly removed from the sprayer and the tank can be removed by removing the four clamps holding the straps in position after the hoses have been disconnected and removed. In all instances, the controls are in easy reach of the operator and the device has the separate clutch for operating the machine or for operating the equipment independently whereby the machine or equipment can be operated independently of each other. The various drive mechanisms employ the use of V-belts with three V-belts being employed for transmitting the force to the drive system for the vehicle wherein a three to one reduction from the motor to the clutch is employed. The spray pump is driven with one V-belt a three to one reduction and the hydraulic pump is driven with one V-belt with six to one reduction. The liquid in the tank is agitated by the return pipe with the small holes therein and also by the use of the agitator propeller. Either section of the discharge pipe and boom may be employed independently as controlled by the spray control valve and any section of the discharge pipe can be cut off or on while the machine is in operation thereby providing an efficient operation and the spraying of liquid in the area which is necessary. The adjustment of the wheel is accomplished by jacking the machine up and loosening the clamp bolt and sliding the depending drive wheel assembly and the sprocket sleeve outwardly so that the spline connection is still in registry with the differential gears.

Wherever desired, pressure gauges and pressure relief valves may be employed to assure safe operation in the various pressure lines. Also, suitable lubrication fittings and grease seals may be employed where desired and where it may become necessary for most efficient operation of the machine. The prime mover will employ a fuel tank, an exhaust which is directed away from the machine so that it will not interfere with efficient operation of the device by the operator sitting in the seat. A suitable shield may be provided for protecting the engine and its associated elements from water and rain. Also, a canopy may be employed in overlying relation to the entire apparatus or to the operator's seat for providing protection for the operator from the sun, rain and the like. All rotating parts of the machine may be encased in suitable protective shields to assure safe operation of the device. In certain instances it may be desirable to encase the drive chain in a housing to prevent the gripping of the clamps between the drive chain and sprocket gears. The operator's seat being positioned at the top of the frame provides proper observation of the machine and also the orientation of the tank and the motor which constitutes the heavy parts of the machine is such that the center of gravity is relatively low thereby reducing any tendency of the machine to turn over in the event the machine is employed in uneven terrain.

The tank may be provided with a drain in the bottom thereof and a suitable filler opening and clean out hole or inspection opening as shown on the drawings.

From the foregoing, it is believed that the operation of the machine will be readily apparent and it is pointed out that the machine is entirely self-propelled and the position of the booms or discharge nozzles may be readily adjusted and controlled. The forward motion of the vehicle may be easily controlled and controlled independently of the spraying operation. Conversely, the spraying operation may be controlled independently of the forward movement of the machine. The machine may be controlled from a directional standpoint by the steering mechanism and also proper operation of the brake mechanism. The brake mechanisms also assure that the machine may be maintained under control at all times and a hand throttle or a foot throttle may be employed for varying the speed of the motor or the motor may be the constant speed type controlled by a suitable type of governor. A drip type oiler mechanism may be employed with the drive chains to assure long life and proper lubrication of the same. Various components may be employed in constructing the device although it will be clearly seen that relatively conventional type of tubular frame elements are employed together with conventional driving mechanisms which may be standardized in order to reduce the production cost of the machine and also in order to reduce replacement cost of materials which may fail.

In further detail, is is pointed out that the motor or internal combustion engine is provided with a hand operated throttle and is also provided with suitable governors employed in various tractors. The details of the governors and other control elements are not shown since they may be varied dependent upon the individual requirements. Also the drain plug mentioned in the tank 210 may be disposed at the rearward end thereof for easy access and the tank may be sloped slightly rearwardly to provide proper drainage for the tank. Drip type oilers are provided for chains 110 and may be located on the inside of bearings 106 and supported on back of frame member 70. Oil is directed to the chains and sprocket by an offset pipe line.

As illustrated in Figure 5, the filler hole or cap is designated by numeral 292 while the inspection plate is designated by the numeral 294. The springs 290 and their association with the lower rails 248 and the pipes 274 maintain the pipes 274 in a desired normal position and permit the rearward swinging movement thereof when the pipes encounter obstructions or when the pipes are swung rearwardly and hooked together at their free ends for transport during road travel. The line or chain 282 may be provided with a turnbuckle adjacent its upper end for adjusting the effective length thereof thereby leveling the pipes 274 so that the pipes 274 may be adjusted to the desired position.

It is pointed out that both of the clutches are of the over-center type and the brake mechanism is of the mechanical type with the bands being disposed exteriorly of the brake drum.

Figure 4:
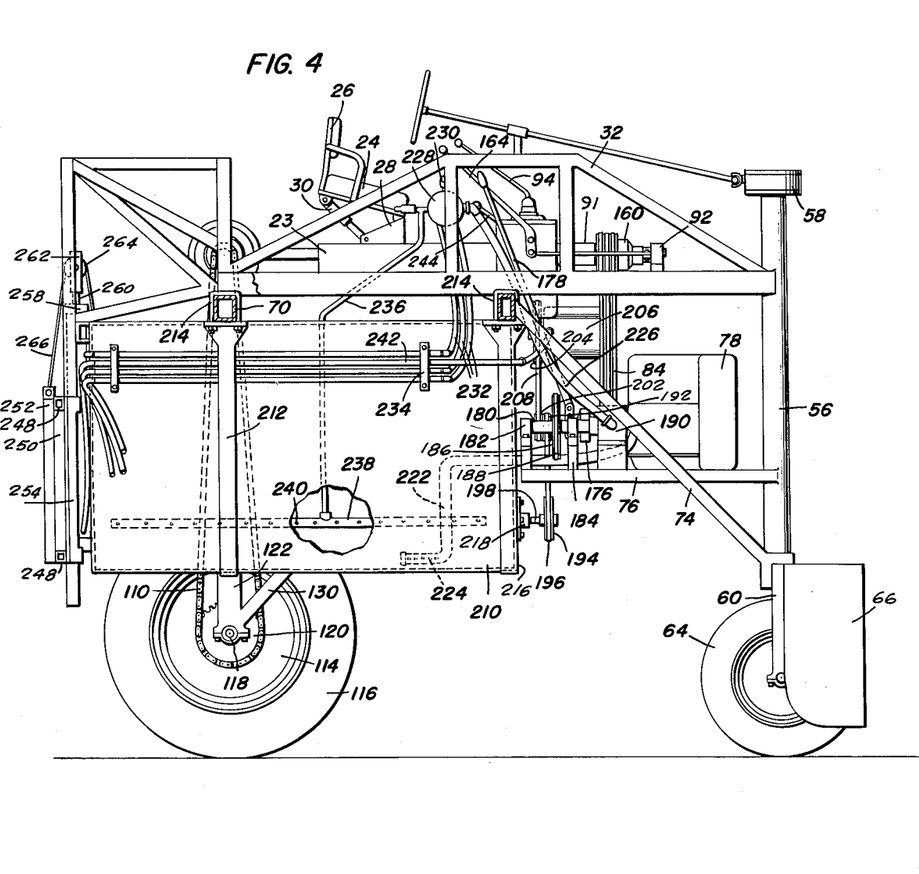
Figure 4 is a side elevational view of the present invention taken from the side opposite to the side shown in Figure 2 and with portions of the tank being broken away illustrating the details of the spray agitator.

The bearings 92 which support the shaft 88 are bolted onto cross members 93 and 95 shown in Figure 5 under the fuel tank for the internal combustion engine. Shaft 88 is connected to the input shaft or stub shaft from the front of the transmission by a shaft coupling 91 of the chain type. This coupling is schematically illustrated in Figure 4 just rearward of multiple pulley 86.

It is pointed out that the U-shaped yoke 60 mounting the front steerable wheel 64 is rigid with the shaft 54 disposed in the housing 56. Also, the shield member 66 serves to push aside any branches of large plants such as cotton and soya beans thus preventing damage to such plants. Shields of similar shape may be employed for shielding the rear wheels for the same purpose. While these shields are not illustrated, they may be mounted on members 122 and curve in front of members 130.

Figure 1:
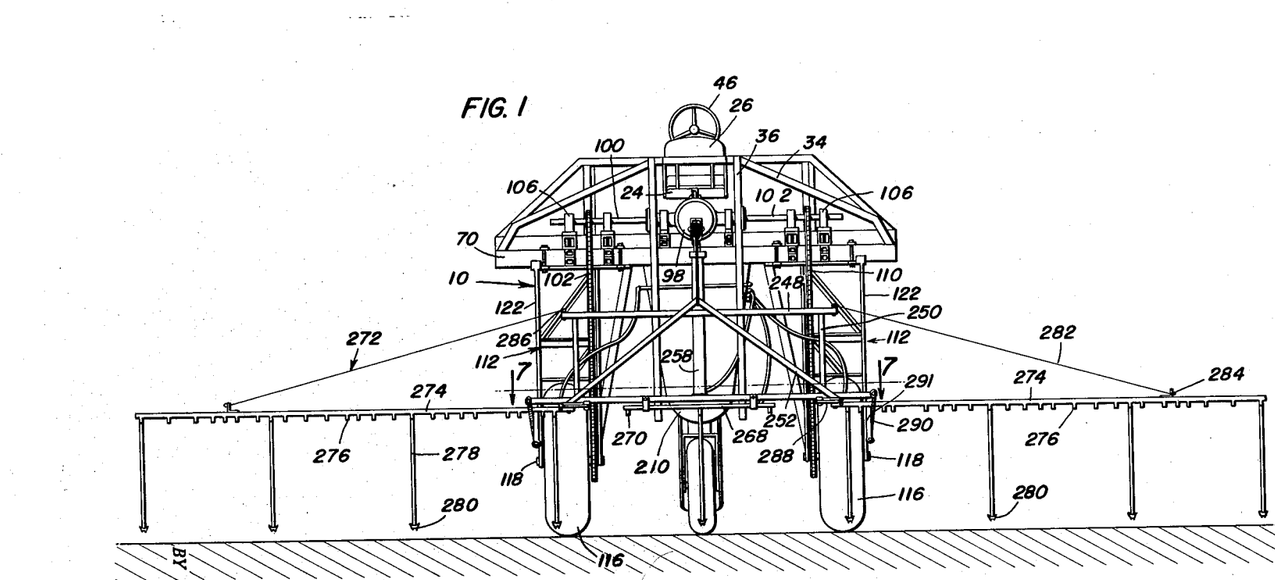
Figure 1 is a rear elevational view of the row crop sprayer of the present invention.
Figure 2:
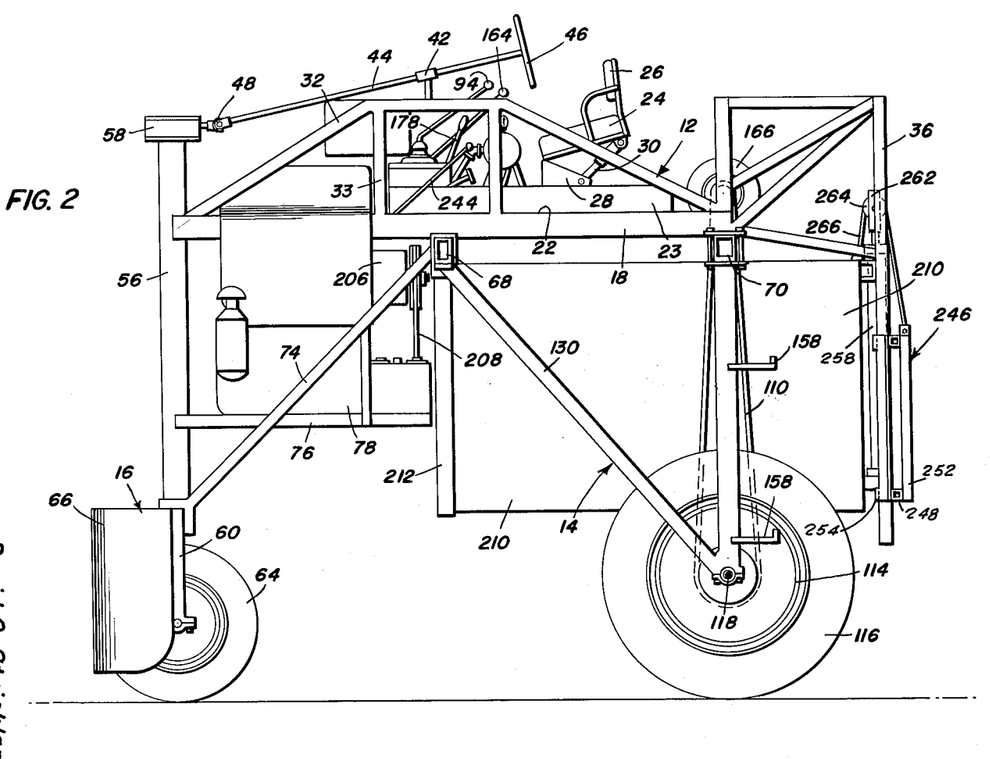
Figure 2 is a side elevational view of the sprayer.
Figure 3:
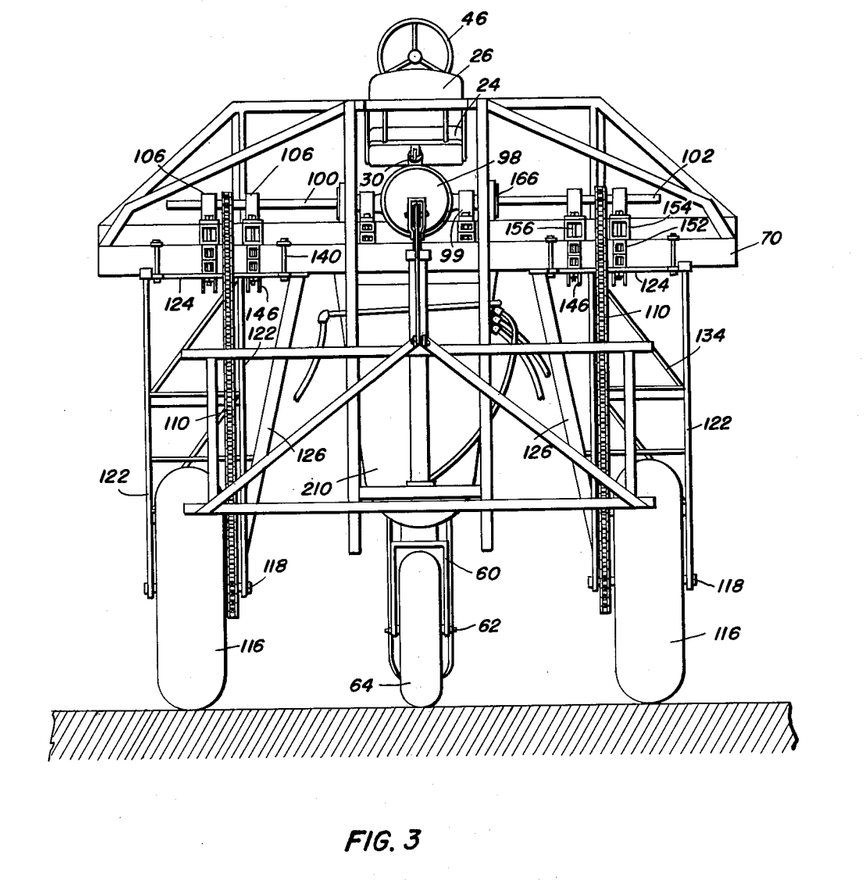
Figure 3 is an enlarged rear elevational view of the sprayer with the sprayer booms removed.

An inverted channel shaped shield 23 for shielding the drive shaft 96 is provided. The drive shaft 96 extends under the shield and the front end of the shield is fastened to member 68 by vertical braces or legs. The seat bracket 28 is bolted to the top of the channel shield 23 and the forward end of platform 22 is bolted to the top side of member 68 with a large notch disposed in the center thereof for permitting the transmission to be fastened to 68. As illustrated in Figure 3, the differential 98 has the diametrically opposed ends thereof secured to the transverse member 70 by brackets 99, which incorporates a suitable U-shaped member and bolts. Bracket means is also provided for the rear end of the shield 23 and such bracket means includes four vertical members fastened to member 70 which extend vertically to member 34 and these members also support the brake shoes or brake bands. Extending forward from these members are two members which are connected at their forward ends by a member parallel to member 70 approximately 12 inches forward of member 70 and 6 inches higher than the member 70 and the rearward end of the shield for the drive shaft 96 is fastened to this cross member. The platform 22 is provided with vertically extending members which are bolted onto each side of the channel shaped shield 23 near the center thereof and adjacent the forward end of bracket 28. The triangulated frame work includes a pair of vertical members 32 extending from the member 32 to the member 18 thus forming a brace for the central part of triangle frame members which extend from housing 56 to the outer ends of cross member 70 thereby supporting the frame work where the load of the front end of tank 210 is applied. A horizontal brace is disposed transversely between the two forward vertical members 33 directly beneath member 40 and at the top of the front of the transmission and the front of the transmission is fastened to this cross brace.

The shaft 80 is splined at the end thereof and serves as a power take-off shaft. All braces rearward of No. 70 are removable so that the tank and all of the boom carrying structure may be removed so that the tractor may be employed as a regular farm tractor as described hereinafter.

In order to permit adjustment of the rear wheels, the drive shafts 100 and 102 are provided with a telescopic joint 101 of a polygonal configuration which permits lateral movement of the bearings 106 and drive sprocket 108 to keep in alignment with the wheel assembly.

The various framing elements, the sizes, strength characteristics, materials, fastening means and other minor details of construction including lubrication features, replacement characteristics of wear parts may all be varied in accordance with well known engineering principles and in accordance with the dictates and requirements of each individual element.

Reference is now made to Figures 11-15 of the official drawings in which the tractor portion of the invention is illustrated with all of the sprayer equipment removed therefrom a drawbar unit generally designated by the numeral 300 is mounted in position under the center of the tractor generally in place of the tank 210.

Figures 12, 13, 14, 15:
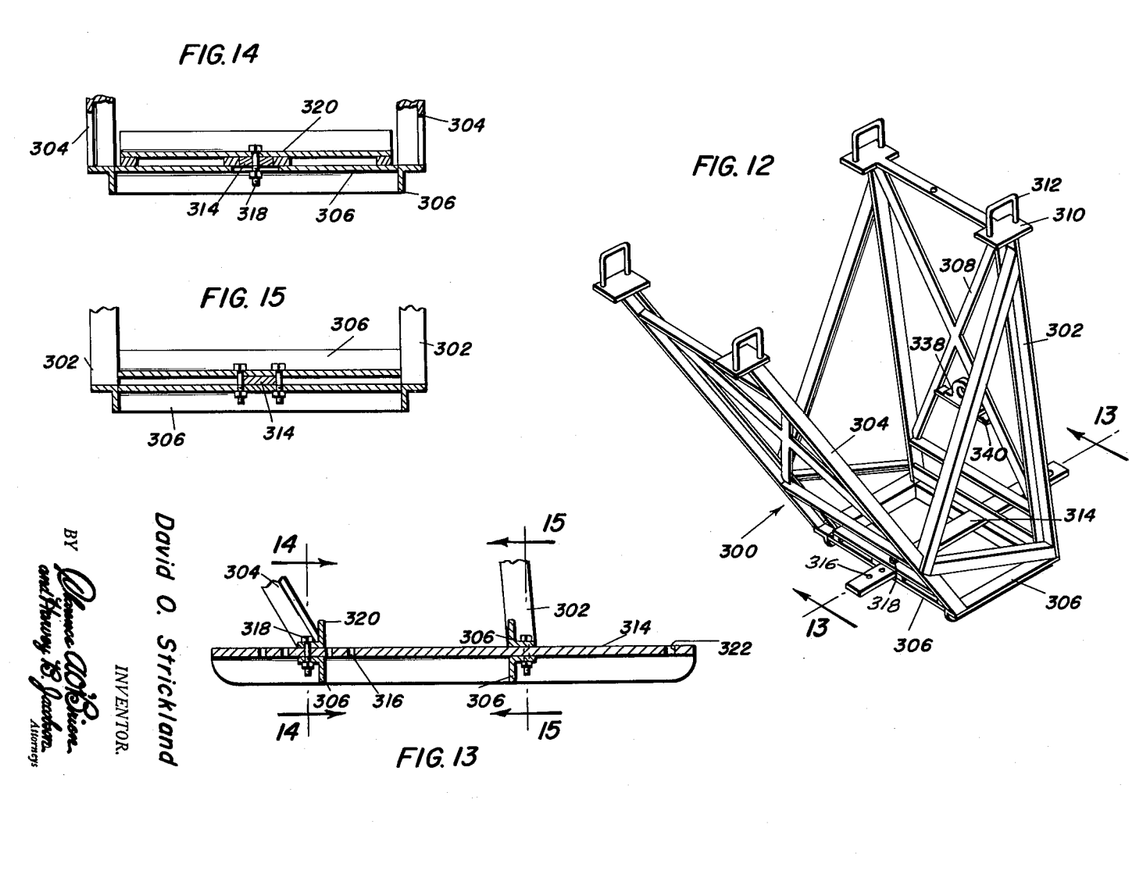
Figure 12 is a perspective view of the drawbar unit which is detachably supported beneath the tractor.
Figure 13 is a longitudinal, vertical sectional view taken substantially upon a plane passing along section line 13—13 of Figure 12 illustrating the details of the longitudinal adjustment of the drawbar construction.
Figure 14 is a transverse, vertical view taken substantially upon a plane passing along section line 14—14 of Figure 13 illustrating further structural details of the drawbar construction.
Figure 15 is a transverse, vertical sectional view taken substantially upon a plane passing along section line 15—15 of Figure 13 further illustrating the details of the drawbar.

The drawbar assembly 300 includes a pair of vertical angle iron members 302. The assembly 300 also includes a pair of forward inclined members 304 with the bottom ends of the members 302 and 304 being interconnected by horizontal brace members 306 and the vertical portions of the members 304 and 302 being interconnected by a plurality of diagonal and inclined brace members 308. The upper ends of each of the members 302 and 304 are provided with a plate 310 which are connected to transverse members 68 and 70 respectively by U-bolts 312 thus detachably mounting the drawbar assembly 300 between the rear wheels in depending relation to the transverse members 68 and 70. The drawbar assembly 300 is of such a length in its vertical dimension that the horizontal brace members 306 are generally disposed below the center of rotation of the wheels 114 and the brace members 306 are supported in horizontal position.

Figure 11:
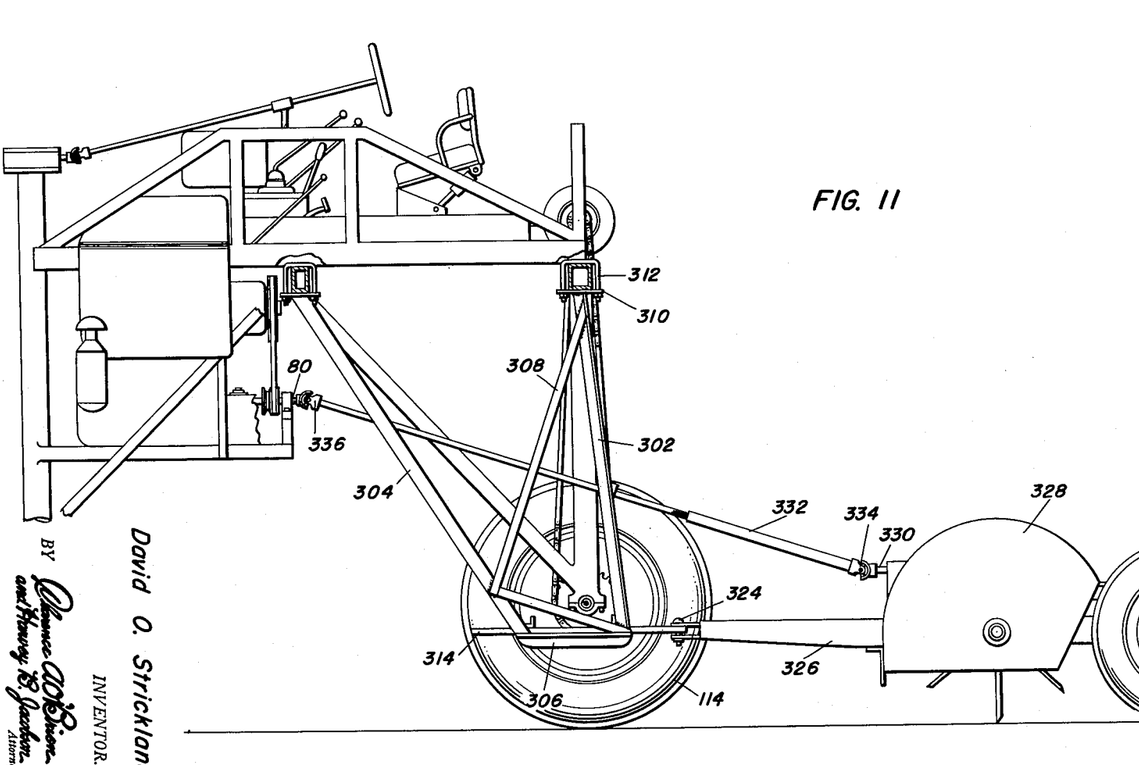
Figure 11 is a partial side elevational view illustrating the tractor employed with a power implement employing a drawbar and a power take-off.

A longitudinally extending drawbar 314 is mounted on the transverse horizontal members 306 with the forward end of the drawbar having a plurality of apertures 316 for selectively receiving a bolt 318 which extends through the horizontal member 306 and a similar upper transverse member 320. This permits longitudinal adjustment of the drawbar 314 and transverse adjustment thereof is provided by permitting transverse sliding movement of the fastening bolt 318 in the horizontal member 306. The rear of the drawbar 314 is provided with an aperture 322 for receiving a removable pin 324 for hitching the tongue 326 of a farm implement generally designated by the numeral 328 for pulling the farm implement 328. The particular implement 328 as illustrated is that type of device requiring rotative power input and includes a power input shaft 330 connected to the telescopic drive shaft 332 by use of a universal coupling 334. The other end of the telescopic drive shaft 332 is provided with a universal coupling 336 and is connected to the splined end of the drive shaft 80 from the internal combustion engine as illustrated in Figure 11 thus transmitting rotational force to the implement 328. A center bearing 338 is supported between diagonal braces 308 on a supporting plate 340 thus forming a center support for the elongated drive shaft 332 thereby preventing whip of the drive shaft due to the length thereof. This also provides adequate rigidity for the drive shaft to permit telescoping movement thereof during changes in the angular relation between the tractor and the implement. While it has not been illustrated, it is pointed out that in certain instances, fluid pressure is employed for actuating the pulled implement. As an example, the raising and lowering of plows or changing the angular position of gangs of disks may be employed by employing the hydraulic pressure system incorporated in the tractor by the hydraulic pump actuated by the internal combustion engine. The battery, air cleaner, fuel tank and other necessary components of the internal combustion engine are not described in detail nor is any starting motor or manual starting means illustrated although they may be provided when necessary and in whatever position desired.

The adjustability feature of the drawbar 314 permits proper orientation of the drawbar in relation to the farm implement and also in relation to the tractor so that a straight pull will be imparted and no tendency to pull the tractor to one side will be caused by the pull of the implement.

In order to increase traction of the device when it is employed as a tractor, wheel weights may be employed. The tractor has been employed in conjunction with disks employing hydraulic cylinder and piston means for changing the angle of the disk harrow gangs and also has been employed with a combine and the drawbar may be positioned in the short or long position and offset to the right or left.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A tractor type vehicle comprising a generally horizontally disposed elevated frame having a transversely disposed frame member at the rear thereof, a pair of depending wheel supporting assemblies, means interconnecting the frame member and assemblies for laterally adjustably mounting the assemblies on said frame member, a driving wheel journaled on the lower portion of each of said assemblies, a depending wheel supporting assembly mounted rigidly at the front of the frame, a steerable wheel rotatably and pivotally mounted on the front wheel assembly intermediate the path of the driving wheels, a prime mover supported from said frame, drive means supported from the frame and interconnecting said prime mover and said drive wheels, and frame supported control means connected with said prime mover, drive means and steerable wheel respectively and disposed adjacent an operator's station on said elevated frame, each of said laterally adjustable wheel supporting assemblies including a pair of parallel, spaced vertically extending members, a pair of parallel, spaced inclined members disposed in the same vertical plane as the vertical members, the lower ends of each pair of members being joined, an axle extending between and journaled in the joined lower ends of said pairs of members, said drive wheel being mounted on said axle, and means on the upper ends of said members for attachment to the frame at laterally spaced points for maintaining the axle in spaced parallel relation to the frame thereby providing a rigid laterally adjustable wheel assembly.

2. A row crop sprayer comprising an elevated frame having an operator's seat, a pair of depending driving wheel assemblies with each assembly including a driving wheel disposed below the frame, means interconnecting the frame and wheel assemblies for transversely adjustably securing said assemblies to the elevated frame, a depending front wheel assembly including a steerable wheel mounted centrally on the front of said elevated frame, power means on said frame, transversely adjustable drive means drivingly connecting the power means with the driving wheels for propelling said elevated frame, steering control means mounted on said elevated frame and being connected with the steerable wheel, a spray supply tank suspended from and disposed below said frame, a transverse spray discharge pipe, means interconnecting the discharge pipe and frame for adjustably mounting the pipe on said frame, power driven pump means intercommunicating the tank and pipe and including a discharge line for discharging liquid spray from said pipe, valve means in said discharge line for controlling the discharge of liquid spray, power driven means interconnecting the frame and discharge pipe for vertically adjusting said discharge pipe, all of said control means being accessible from the operator's seat on the elevated frame.

3. A row crop sprayer comprising an elevated frame having an operator's seat, a pair of depending driving wheel assemblies with each assembly including a driving wheel disposed below the frame, means interconnecting the frame and wheel assemblies for transversely adjustably securing said assemblies to the elevated frame, a depending front wheel assembly including a steerable wheel mounted centrally on the front of said elevated frame, power means on said frame and drivingly connected with the driving wheels for propelling said elevated frame, steering control means mounted on said elevated frame and being connected with the steerable wheel, a spray supply tank suspended from and disposed below said frame, a transverse spray discharge pipe, means interconnecting the discharge pipe and frame for adjustably mounting the pipe on said frame, power driven pump means intercommunicating the tank and pipe and including a discharge line for discharging liquid spray from said pipe, valve means in said discharge line for controlling the discharge of liquid spray, power driven means interconnecting the frame and discharge pipe for vertically adjusting said discharge pipe, all of said control means being accessible from the operator's seat on the elevated frame, said front wheel assembly including a vertical hollow housing rigid with the front of the frame, a vertical shaft rotatably mounted therein, a yoke rigid with the lower end of said shaft, said steerable wheel being journaled on said yoke, a vertically disposed generally U-shaped guard mounted on said yoke forwardly of said wheel and extending below the center of rotation thereof for preventing contact with obstructions.

4. The combination of claim 3 wherein each of said depending driving wheel assemblies includes a pair of vertical members and a pair of vertically inclined members rigidly connected thereto at the lower ends thereof, an axle journaled between the lower ends of said members, said ground engaging wheel being mounted on said axle.

5. The combination of claim 4 wherein each of said axles is provided with a sprocket gear thereon, said means interconnecting the power means and driving wheels including a pair of drive sprocket gears in alignment with the sprocket gears on the wheel axles, means adjustably interconnecting the frame and the drive sprocket gears, means adjustably interconnecting the power means and drive sprocket gears and a sprocket chain encircling the sprocket gears for driving said drive wheels.

6. The combination of claim 5 wherein said power means includes a prime mover mounted below said frame, a longitudinal drive shaft mounted on said frame and being driven from said prime mover, a clutch mechanism and a speed change transmission disposed in said longitudinal drive shaft, said means adjustably interconnecting the power means and drive sprocket gears including a pair of axles and a differential interconnecting said longitudinal drive shaft and axles.

7. A row crop sprayer comprising an elevated frame having an operator's seat, a pair of depending driving wheel assemblies with each assembly including a driving wheel disposed below the frame, means interconnecting the frame and wheel assemblies for transversely adjustably securing said assemblies to the elevated frame, a depending front wheel assembly including a steerable wheel mounted on the front of said elevated frame, power means supported from and disposed below said frame and drivingly connected with the driving wheel for propelling said elevated frame, steering control means mounted on said elevated frame and being connected with the steerable wheel, a spray supply tank suspended from and disposed below said frame, a transverse spray discharge pipe, means interconnecting the discharge pipe and frame for adjustably mounting the pipe on said frame, power driven pump means intercommunicating the tank and pipe and including a discharge line for discharging liquid spray from said pipe, valve means in said discharge line for controlling the discharge of liquid spray, power driven means interconnecting the frame and discharge pipe for vertically adjusting said discharge pipe, all of said control means being accessible from the operator's seat on the elevated frame, said pump means including a suction line extending into said tank, a pump means drivingly connecting the pump to said power means, a bypass line extending from the pump to the tank to bypass liquid back to the tank.

8. The combination of claim 7 wherein said bypass line extends into the tank and terminates adjacent the bottom of the tank for agitating the liquid spray, the terminal end of the bypass line extending substantially throughout the length of the tank and having laterally disposed openings for agitating the liquid in the tank.

9. The combination of claim 8 wherein said tank is provided with a rotatable agitating propeller adjacent the bottom and one end thereof, said propeller being mounted on a shaft journaled in the wall of the tank and extending exteriorly of the tank, and means drivingly connecting the shaft with the power means for rotating said propeller.

10. A row crop sprayer comprising an elevated frame having an operator's seat, a pair of depending driving wheel assemblies with each assembly including a driving wheel disposed below the frame, means interconnecting the frame and wheel assemblies for transversely adjustably securing said assemblies to the elevated frame, a depending front wheel assembly including a steerable wheel mounted on the front of said elevated frame, power means on said frame and drivingly connected with the driving wheel for propelling said elevated frame, steering control means mounted on said elevated frame and being connected with the steerable wheel, a spray supply tank suspended from said frame, a transverse spraying discharge pipe, means interconnecting the discharge pipe and frame for adjustably mounting the pipe on said frame, power driven pump means intercommunicating the tank and pipe and including a discharge line for discharging liquid spray from said pipe, valve means in said discharge line for controlling the discharge of liquid spray, power driven means interconnecting the frame and discharge pipe for vertically adjusting said discharge pipe, all of said control means being accessible from the operator's seat on the elevated frame, a pair of laterally extending booms pivotally supported from the rear of said frame in downwardly spaced relation for swinging movement in a horizontal plane, discharge pipes on said booms and forming a continuation of the transverse discharge pipe for spraying a plurality of rows of crop, and spring means interconnecting the booms and the frame permitting rearward pivotal movement of the booms upon engagement with an obstruction and resiliently urging the booms to a lateral position after passing the obstruction, said means interconnecting the discharge pipe and frame including a vertically movable carriage, means vertically movably mounting the carriage on the frame, a fluid pressure actuated piston and cylinder arrangement connected between said frame and carriage and constituting the means for vertically adjusting the discharge pipe, said booms being pivotally supported from said carriage for vertical movement therewith.

11. The combination of claim 10 wherein each discharge pipe includes a plurality of depending conduits connected thereto and terminating in nozzles for spraying the undersides of the leaves of the plants.

References Cited in the file of this patent

UNITED STATES PATENTS

| | | |
|---|---|---|
| 1,523,048 | Cavins | Jan. 13, 1925 |
| 1,551,094 | Francis | Aug. 25, 1925 |
| 2,184,198 | Seeber | Dec. 19, 1939 |
| 2,381,649 | Dalton | Aug. 7, 1945 |
| 2,442,731 | Paul | June 1, 1948 |
| 2,462,034 | Zeck | Feb. 15, 1949 |
| 2,504,403 | Finley | Apr. 18, 1950 |
| 2,530,053 | Glass | Nov. 14, 1950 |
| 2,590,007 | Griswold | Mar. 18, 1952 |
| 2,603,136 | Thomas | July 15, 1952 |
| 2,647,795 | Kucera | Aug. 4, 1953 |
| 2,655,405 | Lattner | Oct. 13, 1953 |
| 2,657,093 | Kucera | Oct. 27, 1953 |
| 2,706,133 | North | Apr. 29, 1955 |
| 2,725,256 | Devost et al. | Nov. 29, 1955 |
| 2,743,133 | Badders | Apr. 24, 1956 |
| 2,755,128 | Baish | July 18, 1956 |